(12) United States Patent
Yang

(10) Patent No.: US 9,325,834 B2
(45) Date of Patent: Apr. 26, 2016

(54) MOBILE TERMINAL DISPLAY INPUT WITH X-Y COORDINATE SLIDERS

(75) Inventor: Xiaoju Yang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/115,149

(22) PCT Filed: Feb. 20, 2012

(86) PCT No.: PCT/CN2012/071341
§ 371 (c)(1),
(2), (4) Date: Nov. 19, 2013

(87) PCT Pub. No.: WO2012/174870
PCT Pub. Date: Dec. 27, 2012

(65) Prior Publication Data
US 2014/0100000 A1   Apr. 10, 2014

(30) Foreign Application Priority Data

Jun. 23, 2011   (CN) .......................... 2011 1 0171005

(51) Int. Cl.
*H04M 1/725* (2006.01)
*G06F 3/0484* (2013.01)
(Continued)

(52) U.S. Cl.
CPC ......... *H04M 1/72563* (2013.01); *G06F 3/0362* (2013.01); *G06F 3/0484* (2013.01); *G06F 3/04855* (2013.01)

(58) Field of Classification Search
CPC ................................................ H04M 1/72563
See application file for complete search history.

(56) References Cited

U.S. PATENT DOCUMENTS

| 5,666,138 A | 9/1997 | Culver |
| 5,902,972 A | 5/1999 | Nestor et al. |
| 2003/0002902 A1 | 1/2003 | Li |

(Continued)

FOREIGN PATENT DOCUMENTS

| CN | 101609385 A | 12/2009 |
| CN | 101739191 A | 6/2010 |
| WO | 2010029952 A1 | 3/2010 |

OTHER PUBLICATIONS

Chipman et al. Behaviour and Information Technology Jan. 1, 2004, vol. 23, No. 1, p. 1-9, "SlideBar: Analysis of a linear input device" (hereinafter "Chipman").*

(Continued)

*Primary Examiner* — Magdi Elhag
*Assistant Examiner* — David Orange
(74) *Attorney, Agent, or Firm* — Brooks Kushman P.C.

(57) ABSTRACT

A mobile terminal and a method for input control of the mobile terminal are provided. The method comprises: when detecting that the module terminal is in a coordinate control state, inputting a latitudinal position of a target point on a display screen; inputting a longitudinal position of the target point on the display screen; a main control module of the mobile terminal determining the latitudinal and longitudinal position of target point on the display screen according to a latitudinal analog voltage of a display screen latitudinal coordinate controller and a longitudinal analog voltage of a display screen longitudinal coordinate controller, and displaying the target point position on the display screen; the main control module executing a selection operation of an area corresponding to the target point position on the display screen after receiving a triggering indication of the target point position of the display screen.

5 Claims, 2 Drawing Sheets

(51) Int. Cl.
*G06F 3/0485* (2013.01)
*G06F 3/0362* (2013.01)

(56) References Cited

U.S. PATENT DOCUMENTS

2008/0029374 A1    2/2008  Christopher et al.
2009/0160683 A1*   6/2009  Feng ............................. 341/35
2011/0102470 A1    5/2011  Lee
2011/0205178 A1*   8/2011  Yoshida et al. ............... 345/173

OTHER PUBLICATIONS

Bibliography indicating a date for the Chipman reference.*
Extended European Search Report for European Application No. 12803358.6, Completed by the European Patent Office, Dated Dec. 17, 2014, 7 Pages.
Chipman et al. Behaviour and Information Technology Jan. 1, 2004, vol. 23, No. 1, p. 1-9, "SlideBar: Analysis of a linear input device."
PCT International Search Report Dated, Jun. 23, 2011, Application No. PCT/CN2012/071341, Applicant ZTE Corporation, 3 Pages.

* cited by examiner

MOBILE TERMINAL DISPLAY INPUT WITH X-Y COORDINATE SLIDERS

CROSS-REFERENCE TO RELATED APPLICATIONS

This application is a U.S. national phase of PCT Application No. PCT/CN2012/071341 filed Feb. 20, 2012, which claims priority to Chinese Application No. 201110171005.7 filed Jun. 23, 2011, the disclosures of which are incorporated in their entirety by reference herein.

TECHNICAL FIELD

The present document relates to the field of function design technologies of mobile terminals, and in particular, to a mobile terminal and a method for input control of a mobile terminal.

BACKGROUND OF THE RELATED ART

With the development of mobile phone technologies, people are paying more and more attention to the display function of the mobile phone; especially during the emergence of 3G mobile phone, higher requirements are proposed for the display size of the mobile phone. Touch-screen phones have become a popular trend, especially the phones with touch screens more than 2.8 inch, or 3.0 inch. Based on the occurrence of such big size screen, the existing smart phone now gradually cancels most of the keyboards during designing, but realizes operations of phone menus directly using the touch screen and 2-3 function keys. However, in such case, once the touch screen is damaged or is not convenient to be used and there are only 2-3 functional keys, the operations of the phone menus cannot be realized, and even the basis unlocking, calling and texting cannot be achieved, thus for users that is not convenient.

SUMMARY OF THE INVENTION

The technical problem to be solved by the present document is to provide a mobile terminal and a method for input control of the mobile terminal, which provides a novel solution for convenient input of the mobile terminal.

In order to solve the above technical problem, the present document provides a mobile terminal comprising a main control module and a display module, and the mobile terminal further comprises a display screen latitudinal coordinate controller and a display screen longitudinal coordinate controller; the display screen latitudinal coordinate controller is configured to input a latitudinal position of a target point on a display screen; the display screen longitudinal coordinate controller is configured to input a longitudinal position of the target point on the display screen; the main control module is configured to: when detecting that the mobile terminal is in a coordinate key control state, determine a target point position of the target point on the display screen according to a latitudinal analog voltage of the display screen latitudinal coordinate controller and a longitudinal analog voltage of the display screen longitudinal coordinate controller, and notify the target point position to the display module; and after receiving a triggering indication of the target point position of the display screen when the mobile terminal is in the coordinate key control state, execute a selection operation of the target point position; the display module is configured to display the target point position on the display screen.

The above mobile terminal is further characterized in that: a circuit form of the display screen latitudinal coordinate controller and the display screen longitudinal coordinate controller generating the analog voltages is a resistive form, a capacitive form or a photoelectric form.

The above mobile terminal is further characterized in that: the display screen latitudinal coordinate controller comprises a latitudinal resistive stripe and a latitudinal slider which contacts the latitudinal resistive stripe and can slide on the resistive stripe; the display screen longitudinal coordinate controller comprises a longitudinal resistive stripe and a longitudinal slider which contacts the longitudinal resistive stripe and can slide on the resistive stripe; the main control module is further configured to: determine a latitudinal digital voltage of the display screen latitudinal coordinate controller by detecting a voltage corresponding to a position of the latitudinal slider on the latitudinal resistive stripe; and to determine a longitudinal digital voltage of the display screen longitudinal coordinate controller by detecting a voltage corresponding to a position of the longitudinal slider on the longitudinal resistive stripe.

The above mobile terminal is further characterized in that: the mobile terminal further comprises an analog-digital converter connected with the main control module; and the analog-digital converter is connected with the latitudinal slider and the longitudinal slider; the analog-digital converter is configured to convert the analog voltage acquired from the latitudinal slider into a latitudinal digital voltage corresponding to a screen latitudinal coordinate; and convert the analog voltage acquired from the longitudinal slider into a longitudinal digital voltage corresponding to a screen longitudinal coordinate.

The above mobile terminal is further characterized in that: the mobile terminal further comprises a key control indication apparatus, which is configured to indicate to the main control module that the mobile terminal is in a coordinate key control state or a non-coordinate key control state.

The above mobile terminal is further characterized in that: the mobile terminal further comprises a target point position triggering indication apparatus, which is configured to send the triggering indication of the target point position of the display screen to the main control module.

The above mobile terminal is further characterized in that: the mobile terminal further comprises a tri-state triggering apparatus; wherein, the tri-state triggering apparatus is configured to indicate to the main control module that the mobile terminal is in a coordinate key control state, a non-coordinate key control state or a triggering indication of the target point position of the display screen.

In order to solve the above technical problem, the present document provides a method for input control of a mobile terminal, comprising: inputting a latitudinal position of a target point on a display screen; inputting a longitudinal position of the target point on the display screen; when detecting that the mobile terminal is in a coordinate key control state, a main control module of the mobile terminal determining a target point position of the target point on the display screen according to a latitudinal analog voltage of a display screen latitudinal coordinate controller and a longitudinal analog voltage of a display screen longitudinal coordinate controller, displaying the target point position on the display screen, and the main control module, after receiving a triggering indication of the target point position of the display screen when the mobile terminal is in a screen key control state, executing a selection operation of an area corresponding to the target point position on the display screen.

The above method for input control is further characterized in that:

indicating, by a key control indication apparatus, to the main control module that the mobile terminal is in a coordinate key control state or a non-coordinate key control state; and sending, by a target point position triggering indication apparatus, the triggering indication of the target point position of the display screen to the main control module.

The above method for input control is further characterized in that:

indicating, by a tri-state triggering apparatus, to the main control module that the mobile terminal is in a coordinate key control state, a non-coordinate key control state or a triggering indication of the target point position of the display screen.

The present scheme provides a novel solution for convenient input of a mobile terminal, is applicable to various types of mobile phones, and facilitates user operations especially when the original input control mode of the mobile phone is invalid.

PREFERRED EMBODIMENTS OF THE PRESENT INVENTION

A mobile terminal comprises a main control module and a display module, and the mobile terminal further comprises a display screen latitudinal coordinate controller and a display screen longitudinal coordinate controller.

The display screen latitudinal coordinate controller is configured to input a latitudinal position of a target point on a display screen;

the display screen longitudinal coordinate controller is configured to input a longitudinal position of the target point on the display screen;

the main control module is configured to, when detecting that the mobile terminal is in a coordinate key control state, determine a target point position of the target point on the display screen according to a latitudinal analog voltage of the display screen latitudinal coordinate controller and a longitudinal analog voltage of a display screen longitudinal coordinate controller, and notify the target point position to the display module; and is further configured to, when the mobile terminal is in the coordinate key control state, execute a selection operation of the target point position after receiving a triggering indication of the target point position of the display screen;

the display module is configured to display the target point position on the display screen.

Figure 1:
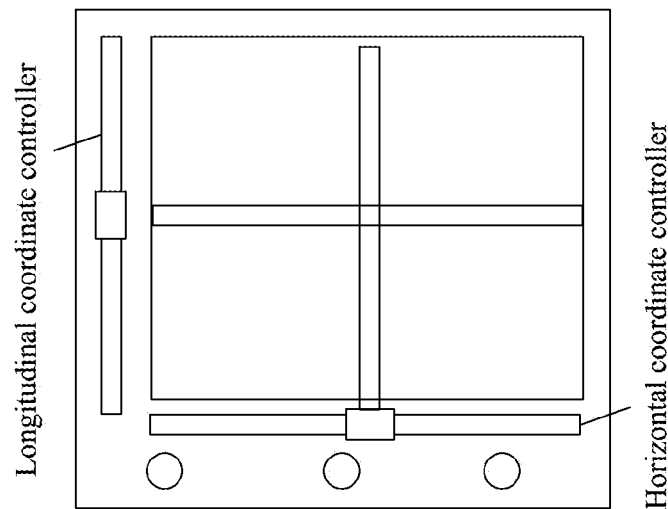
FIG. 1 is a schematic diagram of a control mode of a mobile terminal according to an embodiment of the present document.

As shown in FIG. 1, the latitudinal coordinate controller can implement representing latitudinal coordinate using a mode of slider which corresponds to a latitudinal cursor line on the display screen, and the latitudinal coordinate controller can implement representing longitudinal coordinate using a mode of slider which corresponds to a longitudinal cursor line on the display screen. The display screen can display latitudinal and longitudinal cursor lines; and a user can move the latitudinal and longitudinal cursor lines on the display screen via the latitudinal slider and the longitudinal slider, and after the latitudinal and longitudinal coordinates are determined, a cross point of the two cursor lines is the target point position which is needed to be controlled. After sending to the main control module the triggering indication of the target point position of the display screen by a corresponding function key, the main control module executes the selection operation of the target point position. For example, when calling is needed, a dialing interface of the touch-screen phone can firstly be opened using such an operation method for coordination positioning, and then different number keys on the dialing interface are touched through such the method to determine a phone number and make a call; or, a phone book menu on the phone is opened using such operation method for coordinate positioning, and then the phone number needed to be contacted is found and the call is made using the same method. For another example, when a short message needs to be sent, a soft keyboard of a short message edition interface of a touch-screen phone can be firstly opened through such method, and a text edition menu on the soft keyboard is touched using the same method, and contents of the short message needed to be sent are input and then the short message is sent.

The above design mode not only can enable the user to operate the phone menus with one hand conveniently, but also can enable the user to know the effect of his/her operations conveniently and intuitionally through the coordinate lines set on the screen, thus locating the phone menu accurately so as to perform operations such as making a call or sending short messages, etc., by pressing an enter key. Especially, when the touch function is invalid, this is convenient to the user operation.

When detecting that the mobile terminal is in a non-coordinate key control state, the main control module controls the mobile terminal using a conventional mode in the related art. The non-coordinate key control state refers to a conventional control mode of the mobile terminal, for example, a touch control state when the touch function in the mobile terminal which performs the touch control on the display screen is normal, a function key control state when a function key control function in a mobile terminal which is controlled by a function key is normal.

A circuit form of the display screen latitudinal coordinate controller and the display screen longitudinal coordinate controller generating the analog voltages in the mobile terminal is a resistive form, a capacitive form or a photoelectric form.

Figure 2:
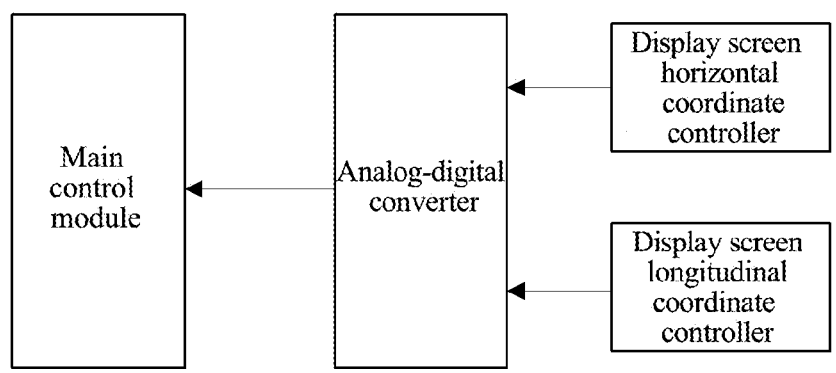
FIG. 2 is a schematic diagram of a constitute structure of a mobile terminal according to an embodiment of the present document.

Taking the resistive form as an example: the display screen latitudinal coordinate controller comprises a latitudinal resistive stripe and a latitudinal slider which contacts the latitudinal resistive stripe and can slide on the resistive stripe; the display screen longitudinal coordinate controller comprises a longitudinal resistive stripe and a longitudinal slider which contacts the longitudinal resistive stripe and can slide on the resistive stripe; and the main control module is configured to determine a latitudinal digital voltage of the display screen latitudinal coordinate controller by detecting a voltage corresponding to a position of the latitudinal slider on the latitudinal resistive stripe; determine a longitudinal digital voltage of the display screen longitudinal coordinate controller by detecting a voltage corresponding to a position of the longitudinal slider on the longitudinal resistive stripe. As shown in FIG. 2, the mobile terminal further comprises an analog-digital converter connected with the main control module; the analog-digital converter is connected with the latitudinal slider and the longitudinal slider; and the analog-digital converter is configured to convert an analog voltage acquired from the latitudinal slider into the latitudinal digital voltage corresponding to a screen latitudinal coordinate, and convert an analog voltage acquired from the longitudinal slider into the longitudinal digital voltage corresponding to a screen longitudinal coordinate.

The coordinate key control apparatus in the mobile terminal can be implemented using two modes.

Figure 3:
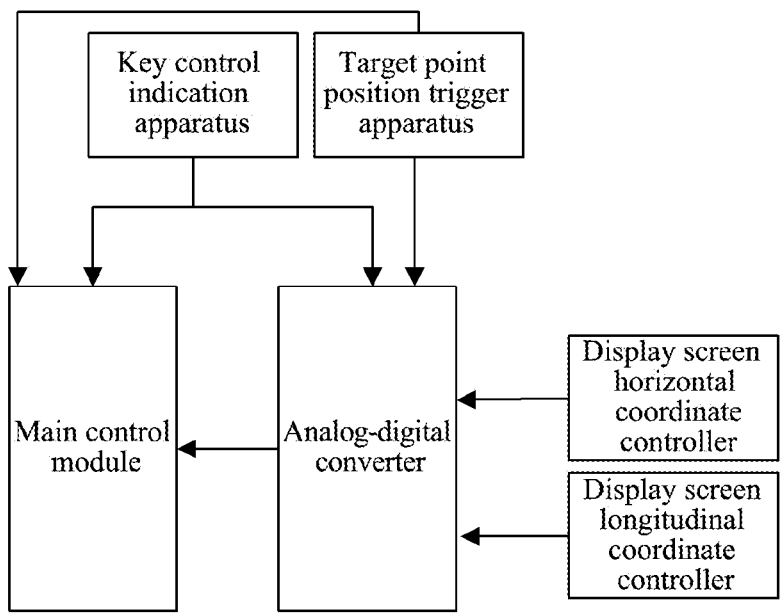
FIG. 3 is a schematic diagram of a structure of a mobile terminal in implementation mode one of a coordinate key control apparatus according to an embodiment of the present document.

As shown in FIG. 3, in the implementation mode one, the mobile terminal comprises a key control indication apparatus for indicating to the main control module that the mobile terminal is in the coordinate key control state or not in the coordinate key control state; and a target point position triggering indication apparatus for sending the triggering indication of the target point position of the display screen to the main control module. As for accessories of the mobile terminal, two function keys need to be added in the mobile terminal; wherein, the first function key belongs to a connection of the key control indication apparatus, and two states of pressing and bouncing of the key correspond to the coordinate key control state and the non-coordinate key control state respectively; and the second function key belongs to the target point position triggering indication apparatus, and the apparatus generates the triggering indication of the target point position of the display screen when this key is pressed.

Figure 4:
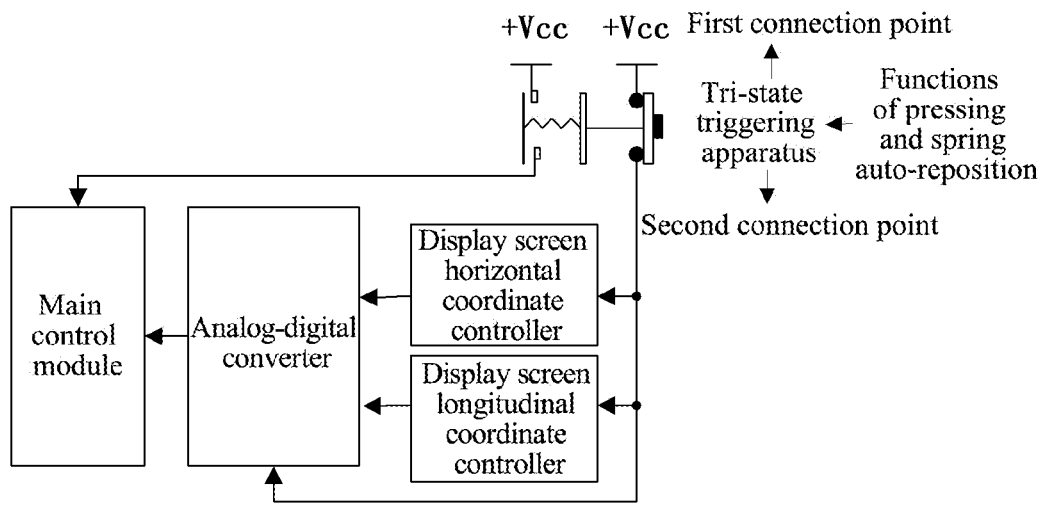
FIG. 4 is a schematic diagram of a structure of a mobile terminal in implementation mode two of a coordinate key control apparatus according to an embodiment of the present document.

As shown in FIG. 4, in the implementation mode two, the mobile terminal can also adopt a form of tri-state triggering apparatus, which indicates to the main control module that the mobile terminal is in the coordinate key control state, not in the coordinate key control state or the triggering indication of the target point position of the display screen. As for accessories of the mobile terminal, only one function key needs to be added in the mobile terminal. When the function key only slides to the second connection point, it corresponds to the non-coordinate key control state in which the power source of the slider is disconnected. When the function key slides to the first connection point, it corresponds to the coordinate key control state in which the power source of the slider is connected because the function key connects the first connection point with the second connection point at this time; under this state, an enabling signal is input to the analog-digital converter but no indication signal is output to the main control module, the analog-digital converter acquires the analog signals generated by the latitudinal coordinate controller and the longitudinal coordinate controller, converts the analog signals to the digital signals and then inputs them into the main control module, and the main control module controls to display the corresponding coordinate. When the function key is in a pressed-down state while connecting the first connection point and the second connection point, the tri-state triggering apparatus generates the triggering indication of the target point position of the display screen, and the mobile phone can be enabled to be touched on the menu, which realizes the menu operation function.

A method for input control of a mobile terminal corresponding to the above apparatus comprises: inputting a latitudinal position of a target point on a display screen; inputting a longitudinal position of the target point on the display screen; when detecting that the mobile terminal is in a coordinate key control state, the main control module of the mobile terminal determining a target point position of the target point on the display screen according to a latitudinal analog voltage of a display screen latitudinal coordinate controller and a longitudinal analog voltage of a display screen longitudinal coordinate controller, and displaying the target point position on the display screen, and the main control module, after receiving an triggering indication of the target point position on the display screen when the mobile terminal is in the screen key control state, executing a selection operation of an area corresponding to the target point position on the display screen.

In the present method, the main control module is indicated by the key control indication apparatus that the mobile terminal is in the coordinate key control state or not in the coordinate key control state; the triggering indication of the target point position of the display screen is sent to the main control module through the target point position triggering indication apparatus; or, the main control module is indicated by the tri-state triggering apparatus that the mobile terminal is in the coordinate key control state, not in the coordinate key control state or the triggering indication of the target point position of the display screen.

It should be illustrated that, embodiments in the present application and features in the embodiments can be combined with each other arbitrarily without conflict.

Of course, the present document can also have other multiple embodiments, and those skilled in the art can make various corresponding changes and variations according to the present document without departing from the spirit and essence of the present document, but all these corresponding changes and variations should belong to the protection scope of the appended claims of the present document.

A person having ordinary skill in the art can understand that all or a part of steps in the above method can be implemented by programs instructing related hardware, and the programs can be stored in a computer readable storage medium, such as a read-only memory, magnetic disk or optical disc, etc. Alternatively, all or a part of steps in the above embodiments can also be implemented by one or more integrated circuits. Accordingly, each module/unit in the above embodiments can be implemented in a form of hardware, and can also be implemented in a form of software functional module. The present document is not limited to any particular form of combination of hardware and software.

INDUSTRIAL APPLICABILITY

The present scheme provides a novel solution for convenient input of a mobile terminal, is applicable to various types of mobile phones, and facilitates user operations especially when the original input control mode of the mobile phone is invalid.

What is claimed is:
1. A mobile terminal, comprising at least one processor configured to execute a main control module and a display module, and further comprising a display screen latitudinal coordinate controller and a display screen longitudinal coordinate controller; wherein,
the display screen latitudinal coordinate controller is configured to input a latitudinal position of a target point on a display screen, wherein the display screen latitudinal coordinate controller comprises a latitudinal resistive stripe and a latitudinal slider which contacts the latitudinal resistive stripe and can slide on the resistive stripe;
the display screen longitudinal coordinate controller is configured to input a longitudinal position of the target point on the display screen, wherein the display screen longitudinal coordinate controller comprises a longitu- dinal resistive stripe and a longitudinal slider which contacts the longitudinal resistive stripe and can slide on the resistive stripe;

the main control module is configured to: when detecting that the mobile terminal is in a coordinate key control state, determine a latitudinal digital voltage of the target point by detecting an analog voltage corresponding to a position of the latitudinal slider on the latitudinal resistive stripe and a longitudinal digital voltage of the target point by detecting an analog voltage corresponding to a position of the longitudinal slider on the longitudinal resistive stripe, and notify the target point position to the display module; and after receiving a triggering indication of the target point position of the display screen when the mobile terminal is in the coordinate key control state, execute a selection operation of the target point position; and the display module is configured to display the target point position on the display screen; and the mobile terminal further comprises a first key and a second key, or comprises a tri-state triggering apparatus; wherein when the mobile terminal comprises the first key and the second key, a pressing state of the first key indicates that the mobile terminal is in the coordinate key control state and a bouncing state of the first key indicates that the mobile terminal is in a conventional control mode, and a pressing state of the second key indicates the triggering indication of the target point position; or, when the mobile terminal comprises the tri-state triggering apparatus, the tri-state triggering apparatus indicates that the mobile terminal is in the coordinate key control state or a conventional control mode, or the triggering indication of the target point position;

wherein the coordinate key control state refers to the mobile terminal being controlled by a target point defined with a latitudinal position and a longitudinal position on the display screen.

2. The mobile terminal according to claim 1, wherein, a circuit form of the display screen latitudinal coordinate controller and the display screen longitudinal coordinate controller generating the analog voltages is a resistive form, a capacitive form or a photoelectric form.

3. The mobile terminal according to claim 1, wherein, the mobile terminal further comprises an analog-digital converter connected with the main control module; and the analog-digital converter is connected with the latitudinal slider and the longitudinal slider; and the analog-digital converter is configured to convert the analog voltage acquired from the latitudinal slider into a latitudinal digital voltage corresponding to a screen latitudinal coordinate; and convert the analog voltage acquired from the longitudinal slider into a longitudinal digital voltage corresponding to a screen longitudinal coordinate.

4. The mobile terminal according to claim 1, further comprising: a target point position triggering indication apparatus executable by the at least one processor, wherein the target point position triggering indication apparatus is configured to send a triggering indication of the target point position of the display screen to the main control module and indicate to the main control module that the target point position of the display screen is in a triggering state.

5. A method for input control of a mobile terminal, comprising:

inputting a latitudinal position of a target point on a display screen through a latitudinal resistive stripe and a latitudinal slider which contacts the latitudinal resistive stripe and can slide on the resistive stripe;

inputting a longitudinal position of the target point on the display screen through a longitudinal resistive stripe and a longitudinal slider which contacts the longitudinal resistive stripe and can slide on the resistive stripe;

when detecting that the mobile terminal is in a coordinate key control state, a main control module of the mobile terminal determining a latitudinal digital voltage of the target point by detecting an analog voltage corresponding to a position of the latitudinal slider on the latitudinal resistive stripe and a longitudinal digital voltage of the target point by detecting an analog voltage corresponding to a position of the longitudinal slider on the longitudinal resistive stripe;

displaying the target point position on the display screen, and after receiving a triggering indication of the target point position of the display screen when the mobile terminal is in the coordinate key control state, the main control module of the mobile terminal executing a selection operation of an area corresponding to the target point position on the display screen;

wherein the coordinate key control state of the mobile terminal is indicated by a pressing state of a first key and a conventional control mode of the mobile terminal is indicated by a bouncing state of the first key, and the triggering indication of the target point position is indicated by a pressing state of a second key; or the coordinate key control state of the mobile terminal, a conventional control state and the triggering indication of the target point position are indicated by a tri-state triggering apparatus; and wherein the coordinate key control state refers to the mobile terminal being controlled by a target point defined with a latitudinal position and a longitudinal position on the display screen.

* * * * *